Jan. 4, 1949.  F. J. MacDONALD  2,458,182
MOLDING APPARATUS
Filed Aug. 18, 1945  2 Sheets-Sheet 2
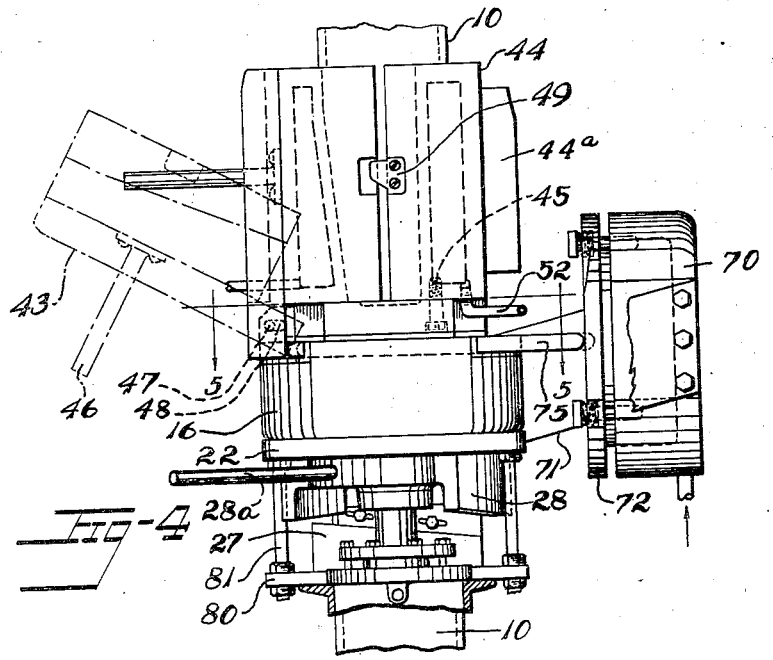
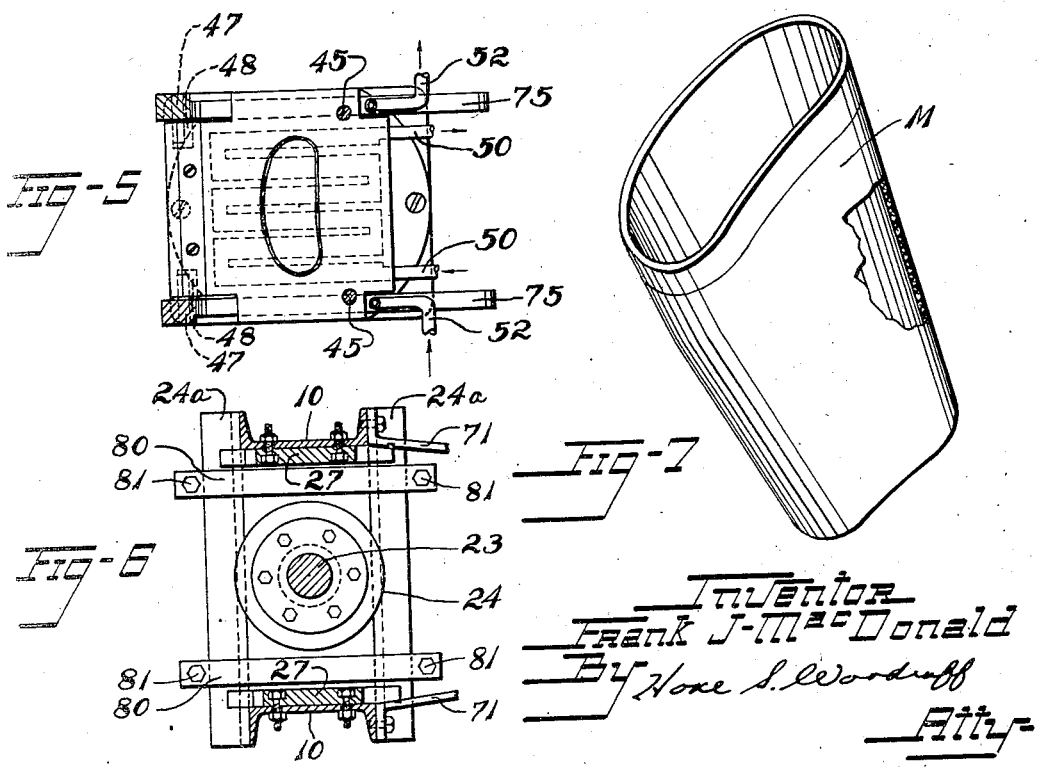
Inventor
Frank J. MacDonald
By Hoxie S. Woodruff
Atty.

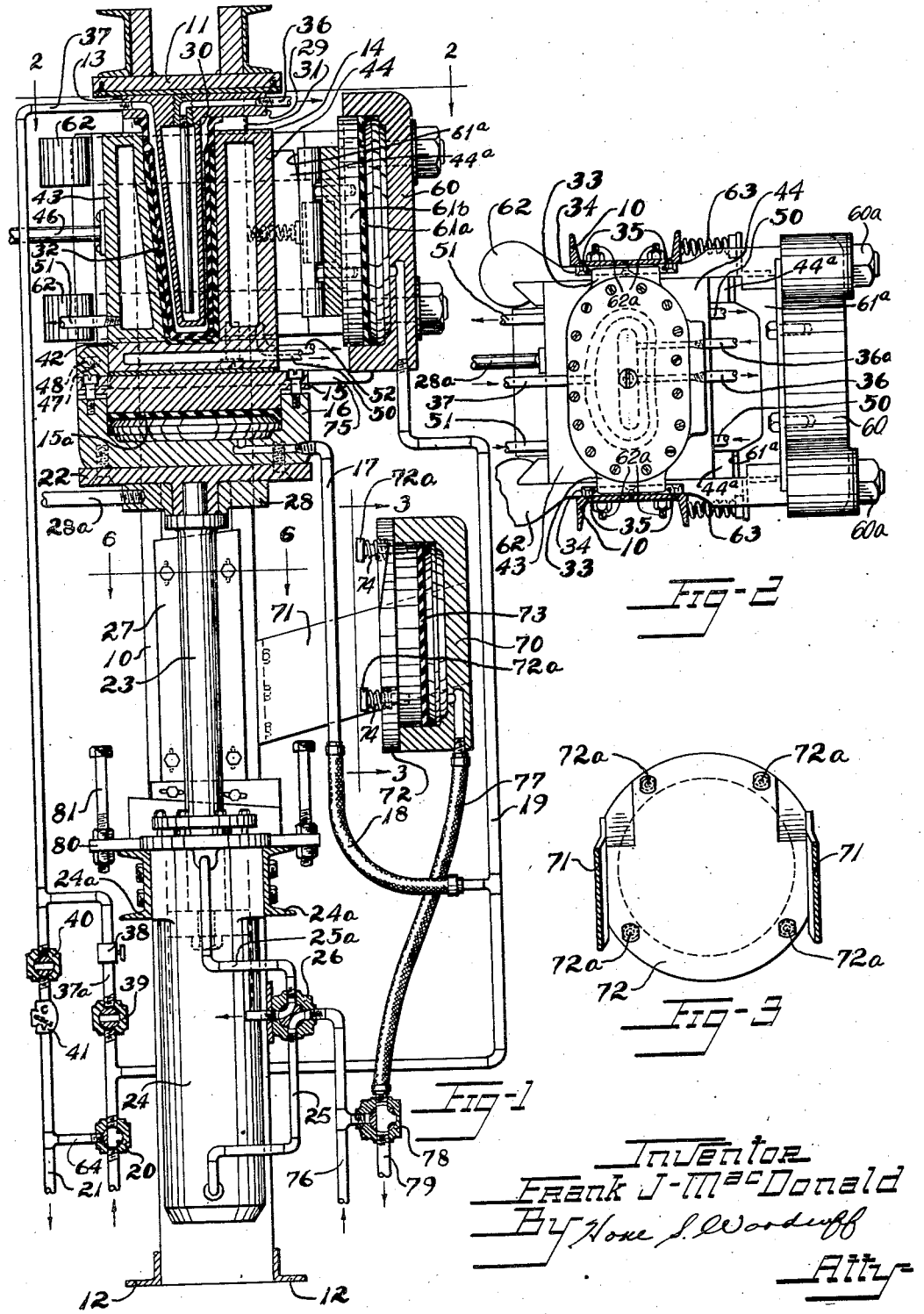

Patented Jan. 4, 1949

2,458,182

UNITED STATES PATENT OFFICE 2,458,182

MOLDING APPARATUS

Frank J. MacDonald, Brookline, Mass., assignor to The B. F. Goodrich Company, New York, N. Y., a corporation of New York Application August 18, 1945, Serial No. 611,366

15 Claims. (Cl. 18—19)

This invention relates to the molding of articles from plastic materials and relates particularly to apparatus for molding deeply contoured hollow articles such as helmet liners, binocular carrying cases and the like, from thermosetting materials.

It is an object of this invention to provide improved apparatus for molding articles from blanks comprising thermosetting or thermocuring molding materials whereby the blank is quickly and efficiently transformed into a finished molded article of superior properties with a reduction in the cost of labor and materials and with an increase of efficiency. Another object is to provide apparatus which is quickly and easily adaptable to the molding of a variety of molding materials requiring a wide difference in molding temperatures and pressures. It is a further object of this invention to provide apparatus for molding which is light and more easily operated by labor of the light weight class and which, by virtue of its lightness, shall be less expensive to build and install.

Further objects will become apparent in the detailed description of the invention which is to follow.

The molding apparatus of this invention broadly comprises a take-apart mold comprising male and female members, one of the mold members being movably mounted for movement into and out of molding engagement with the other. Also, one of the mold members is provided with a flexible distensible diaphragm associated therewith for defining an internal pressure chamber by means of which the moldable material is forced against the internal shape-determining surfaces of the other mold member. In conjunction with the take-apart mold there is provided a compound pressure-exerting means comprising a low pressure, fast-action air cylinder for bringing the movable mold member into alignment and approximate molding relation to the other mold member, means to lock the air piston in such position and a short-travel high pressure hydraulic cylinder acting from the air piston to bring the mold members tightly together in final molding relationship.

This invention is an improvement upon the subject matter of my copending application Serial No. 502,597, filed September 16, 1943, now Patent No. 2,415,504, issued February 11, 1947.

The invention will be described in greater detail with reference to an illustrative embodiment shown by the accompanying drawings, of which:

Fig. 1 is a side elevation in section of an illustrative embodiment of this invention, having a take-apart mold suitable for molding binocular carrying cases and the like;

Fig. 2 is a horizontal section taken along the line 2—2 of Fig. 1;

Fig. 3 is a vertical section taken along the line 3—3 of Fig. 1;

Fig. 4 is an enlarged side elevation of part of the apparatus of Fig. 1, disclosing details of the mold members and the locking mechanism;

Fig. 5 is a horizontal section taken along the line 5—5 of Fig. 4;

Fig. 6 is a horizontal section taken along the line 6—6 of Fig 1;

Fig. 7 is a perspective view of a binocular carrying case member or similar article molded in the apparatus of Fig. 1 and partially broken away to disclose the character of the fabric reinforced thermosetting plastic material.

Referring to the drawings, the molding apparatus of this invention comprises a frame consisting of two upstanding columns 10, 10 of channel iron and a top cross member 11 composed of channel iron and steel plate. The columns 10, 10 may be fastened to the floor, or other supporting structure, by means of angle irons 12, 12. A male mold member indicated generally by the numeral 13 is suspended between the columns 10, 10 at the top thereof and hanging downwardly therefrom. A female mold member, indicated generally by the numeral 14, is mounted upon the floating piston 15 of a short-stroke, heavy-walled hydraulic cylinder 16. The piston 15 is provided with a heavy rubber sealing gasket 15a which is secured to the face of the piston as shown in Fig. 1. Fluid under pressure is supplied to cylinder 16 through pipe 17, a flexible communicating hose 18 being used to connect the fluid inlet pipe 17 to the fluid supply line 19. Two-way valve 20 serves to connect pipe 17 to the fluid supply line 19 or to the exhaust line 21.

The hydraulic cylinder 16 rests upon a cylinder supporting plate 22 which in turn is engaged by the piston rod 23 of a light-walled air cylinder 24. Cylinder 24 is supported from the columns 10, 10 by channel beams 24a, 24a. Low pressure air is supplied respectively to the bottom or top of the air cylinder 24 through pipes 25, 25a and four-way valve 26. A locking mechanism adapted for manual operation consists of opposed locking seats comprising plates 27, 27, secured to the columns 10, 10 and a latch casting 28 on the air piston 23 just below the supporting plate 22 and adapted to be rotated into and out of engagement with the locking seats 27, 27 by manual rotation of the casting 28 by means of the handle 28a. The locking mechanism forms a bridge between the columns 10, 10 thereby positioning the air piston 23 in an approximate molding position with the mold members slightly separated.

The male mold member 13 comprises an upper plate 29 integral with a long thin core portion 30 which is cored out for steam heating. A metal bag-retaining ring 31 in conjunction with the upper plate 29 of the male mold member, holds the flared skirt of a distensible diaphragm or bag 32 in place surrounding and overlying the metal core portion 30 and forming a fluid-tight pressure chamber therewith. The male mold member 13 is mounted between the upright columns 10, 10 and is supported by extending lugs 33, 33 which rest freely on angle irons or blocks 34, 34 which are bolted to the columns 10, 10. The male mold member 13 is laterally positioned on the supporting blocks 34, 34 by pins 35, 35 extending upwardly from the blocks 34, 34. Steam for heating the mold member 13 is introduced to the core portion 30 through pipes 36, 36a. Fluid under pressure, preferably an evaporable fluid like water, is introduced to the chamber between the bag and the core portion 30 through pipes 37, 37a. The pipe 37a contains a needle valve 38 for retarding the flow of fluid to the bag 32. Fluid is exhausted from the chamber through pipe 37 by closing the cut-off valve 39 and opening valve 40 so as to allow exhaust through the check valve 41.

The female mold member 14 may be a hollowed out concave metallic mold member of the take-apart type adapted to be opened for removal of the molded article. The female mold 14 is split horizontally along a flat surface at the bottom of the mold so as to form a flat bottom platen 42 and an upper portion. The upper portion in turn is split vertically to form a hinged side portion 43 and a fixed side portion 44. The fixed side portion 44 is fastened in place on the bottom platen 42 by countersunk stud bolts 45, 45 passing entirely through the bottom platen 42. The hinged side portion 43 is arranged to be manually opened by grasping lever 46 and swinging the side portion 43 outwardly and downwardly on hinges consisting of bolts 47, 47 fixed in the corners of mold section 43 and passed through slotted holes 48, 48 in bottom platen 42. The two side portions of the female mold 14 are provided with a guide device 49 which aligns the two side portions while the mold is being closed. All three portions of the female mold member 14 are cored for heating, steam or the like being supplied to the bottom platen 42 through pipes 50, 50; to the hinged side portion 43 through the pipes 51, 51; and to the fixed side portion 44 through pipes 52, 52. To permit the necessary vertical movement of the entire female mold 14, the aforementioned steam pipes need to be connected to the steam supply by means of flexible communicating hose (not shown).

When a split female mold member is used in conjunction with an internal pressure exerting means such as the extensible bag, it is desirable to exert pressure at right angles to the vertical split in the mold to close the mold upon the blank of moldable material. In the illustrative embodiment, a second short-travel high pressure hydraulic cylinder 60 having a piston 61 acts horizontally upon the female mold member, the piston 61 having projecting faces 61a, 61a making contact with similar projecting faces 44a, 44a on the fixed section 44 of the female mold. The piston 61 is fitted with a heavy rubber sealing gasket 61b. The cylinder 60 is supported from the columns 10, 10 by means of clamp bars 62, 62, which are bolted to the columns 10, 10 by bolts 62a, 62a. The cylinder 60 is secured to the bars 62, 62 by four nuts 60a, 60a. The bars 62—62 also serve as guides for the female mold member 14 while it is being raised to the upper position. When the piston 61 is urged to the left (Figs. 1 and 2), the projecting faces 61a, 61a on the piston make contact with the projecting faces 44a, 44a of the mold member 44. Since the two female mold members 43, 44 are mounted on platen 42 which is supported by floating piston 15 in cylinder 16, and cylinder 16 is in turn mounted on piston 23, there is necessarily a slight amount of lateral play in this whole assembly when piston 23 is extended as shown in Fig. 1. Inasmuch as the clearance between the hooked ends of clamp bars 62, 62 and mold section 43 is only a few thousandths of an inch, the whole mold assembly 14 and its supporting piston is moved slightly to the left and the two mold sections 43, 44 are squeezed together between piston 61 and the hooks of clamp bars 62, 62 as piston 61 is urged further to the left, the coiled springs 63, 63 serving to return the piston 61 to the open position when the pressure in cylinder 60 is released. Fluid under pressure may be supplied to cylinder 60 through pipe 19 by opening valve 20. Fluid may be exhausted from cylinder 60 by turning valve 20 to the exhaust position whereby fluid is exhausted through line 64.

To facilitate the opening of the mold and to break the parts of the female mold away from the molded article, an auxiliary kicker cylinder 70 is located opposite the lower rest position of the air piston 23. The cylinder 70 is supported from the columns 10, 10 by brackets 71, 71. The cylinder 70, as shown in Fig. 1, is provided with projecting studs 72a, 72a which pass through piston 72 and on which the piston is slidably mounted. A heavy rubber sealing gasket 73 is provided for piston 72 and coiled springs 74, 74 are mounted in compression between the heads of studs 72a, 72a and the face of piston 72 to return piston 72 to its retracted position when the pressure in cylinder 70 is released. As piston 72 is urged to the left (Fig. 4) its face engages kicker bars 75, 75 which are recessed in the floating piston 15 of the vertical hydraulic cylinder 16. The kicker bars 75, 75 engage the bottom corners of the hinged side portion 43 and move the side portion of the mold out slightly until the bolts 47, 47 are at the outer end of the slotted holes 48, 48 thereby permitting the side portion 43 to swing outwardly and downwardly as shown in the broken lines of Fig. 4. The cylinder should be a fast-action cylinder, but low pressure air in the neighborhood of 100 pounds per square inch may be used to actuate the piston. Air is supplied to cylinder 70 from supply line 76 through flexible coupling 77 and two-way valve 78. Air is exhausted from cylinder 70 through line 79.

For supporting the air piston and the female mold in the lower or open position, a rest support is provided consisting of bars 80, 80 extending across the channel beams 24a, 24a and adjustable bolts or pins 81, 81 extending upwardly therefrom to engage the cylinder supporting plate 22.

In operation of the apparatus described above, a blank of plastic moldable material, which may comprise fabric layers treated with a suitable thermosetting resin, is inserted in the opened female mold member while it is at the lower rest position and the mold is raised to the upper rest position by turning four-way valve 26 so as to connect pipe 25 to the air supply line 76. When the piston 23 has reached a position opposite the locking seats 27, 27, the rotary latch casting 28 is rotated by hand into engagement with the locking seats 27, 27. High pressure fluid is then admitted to cylinders 16 and 60 and to the diaphragm 32 by closing valve 40 and turning valves 20 and 39 to the open position. Since the volume of the bag 32 is substantially less than that of the cylinders 16 and 60, the needle valve 38 is interposed in the line to reduce the rate of flow therein. It must be noted that the cored portions of the mold are continuously heated by steam for the cycle of molding operations normally is too short to permit heating and cooling of the mold parts. After the mold has been completely closed by the coaction of the two hydraulic cylinders, the bag continues to fill and the cure begins. The thin layer of water or other vaporizable fluid contained between the bag and the male mold member is quickly heated to a temperature nearly that of the male mold and heat is transmitted from the water through the diaphragm to the inside of the blank of moldable material. In the above inflation steps it is necessary to maintain a differential in the rate of flow to the bag as compared to the flow to the cylinders for if this is not done the bag being of less volume than the cylinders will fill quickly and may burst before the mold is closed by the cylinders.

The time required for setting of the resin is usually six to eight minutes depending upon the thickness of the molded article and the temperatures of the mold parts. When the article has "set" the procedure for opening the mold is the reverse of closing. Again a differential in the rate of flow is utilized to deflate the diaphragm and the cylinders in proper sequence, the bag being deflated first so as to free the diaphragm from the molded article. The bag is deflated first by closing valve 39 and opening valve 40; the check valve 41 permitting the fluid to flash off as steam, while preventing influx of vapor air to such an extent that upon condensation of the vapor in line 37, a vacuum is produced therein and the diaphragm 32 is pulled away from molded article and collapsed upon the male mold member 13. Cylinders 16 and 60 are exhausted by turning valve 20 to the exhaust position. The release of pressure in the diaphragm 32 and in the cylinders 60 and 16 completely frees the male mold member 13 from the molded article. The air piston 23 may then be lowered by rotating the rotary latch 28 and turning the four-way valve 26 so as to connect the air supply line 76 through pipe 25a to the top of the cylinder 24.

The female mold member is opened by turning valve 78 so as to admit air to cylinder 70 thereby causing piston 72 to engage kicker bars 75 which push the hinged side portion of the female mold member sidewise in the slotted holes of the hinges thereby permitting the lowering of the hinged side portion. The molded article may then be lifted out and the molding cycle repeated. A binocular carrying case member M molded from fabric reinforced thermosetting material in the apparatus described above, is shown in Fig. 7 of the drawings.

The pressure exerted by the hydraulic cylinders and the bag must be sufficient to produce bonding of layers of fabric and resin. The pressure has been found to be in the neighborhood of 500 to 1000 pounds per square inch for most thermosetting-type resins. Steam at 500 to 1000 pounds per square inch is much too hot for curing of plastics for the temperature required for curing these resins is only about 350° Fahrenheit. Steam at 350° is much too low in pressure for compressing the molding material so the use of steam as a single heating and pressure-exerting medium is not feasible. It is seen therefore, that the compound pressure-exerting system of this invention in combination with steam of the proper temperature comprises a flexible means in which the conditions of temperature and pressure may be varied independently of each other. Further, since the high pressure hydraulic cylinders are short, a great economy in the use of high pressure fluid is realized and the size of the hydraulic pressure pumps is reduced.

To simplify piping arrangements and to eliminate the necessity of a number of high pressure fluid pumps, it is preferred to use the same pressure in the two hydraulic cylinders as in the bag. The two hydraulic cylinders desirably should be designed to have areas larger than the respective projected areas of the bag on the pistons. In this way the force tending to close the mold exerted by the cylinders, exceeds the force exerted by the bag which tends to open the mold. However, should the conditions warrant it, a higher pressure could be used in the cylinders or vice versa. With suitable pressure reducing valves adjustable to the desired pressures it is possible to obtain great flexibility of molding conditions thereby making possible the molding of a variety of moldable materials.

The distensible diaphragm or internal pressure bag may be made of any suitable extensible rubber or other rubber-like material such as either a natural or synthetic rubber preferably compounded for resistance to heat. It has been found that compounds similar to those well known to the rubber compounding art, which have been used in the past for tire-curing water bags will be suitable for making the diaphragm of the present apparatus.

The air piston is required to lift no more than the weight of the short cylinder, the mold and the locking mechanism. The pressure required to accomplish this is so low that the cylinder itself may be very light. Since the air piston need lift only a light load it is faster in action than a hydraulic cylinder thereby effecting a saving in time during the operation of closing the press. When the short hydraulic cylinder is used in combination with the low-pressure air cylinder, the two can be built into a comparatively light press frame and at the same time exert pressure equivalent to that of an ordinary heavy hydraulic press of more massive proportions and slow-operating characteristics. This produces savings in both the cost of construction and installation as well as in time and cost of operation.

It will be appreciated that not all molded articles will require a split female mold member of the character described. Flat articles or concavo-convex articles having a shallow body portion do not require opening of the mold in order to remove the article from the mold. The upper horizontal hydraulic cylinder 60 is needed only when a split mold is required.

The molding apparatus disclosed herein is a greatly improved tool of considerable importance to the art of rapid molding of plastic articles. It is adaptable with equal facility to the molding of flat thin pieces and deep thin-walled items, such as binocular carrying cases, case covers, golf bags, etc., and for blanking, forming and trimming sheet material.

The chief advantages derived from the use of this apparatus are: comparative cheapness of the press itself, use of high pressure fluid in a light press which is easily operated, economy in the use of high pressure fluid, the advantage of not having to remove the mold from the press in order to put in blanks and to remove the molded product, the advantage of a faster molding cycle made possible by the fast opening and closing of this press, and a further saving in labor for it is possible to utilize female labor of the light weight class to operate this apparatus. In addition, the molding apparatus of this invention is quickly and easily adaptable to the changes of temperature and pressure necessary when molding different materials, or when the mold shape is changed, or when the material thickness is increased. The press of this invention is faster and more efficient than conventional presses suitable for molding large articles.

While I have described my invention in considerable detail as illustrated by a prefererd embodiment, it will be understood that modifications therein may be made without departing from the true spirit and scope of the invention as it is defined by the appended claims.

I claim:

1. Apparatus for molding deeply contoured hollow concavo-convex articles such as helmet liners, binocular carrying cases and the like, said apparatus comprising a frame having a pair of upstanding columns, a male mold member of metallic material depending between said columns, said member being cored for heating and having communicating means for supplying heating fluid thereto, a flexible diaphragm of extensible material associated with and separate from said male member so as to define a fluid-tight chamber therewith, communicating means connecting with said fluid-tight chamber for supplying fluid under pressure thereto, communicating means connecting with said fluid-tight chamber for exhausting fluid therefrom, means in said exhaust means for restricting the return of fluid thereto, a deeply contoured female mold member mounted for vertical movement toward and away from said male mold member, said female mold member being vertically divided and one of the divided parts being hinged so as to swing open, the divided parts of said female mold member being cored for heating and having communicating means for supplying heating fluid thereto, a low-pressure air cylinder and piston assembly mounted between said uprights so as to raise and lower said female mold, opposed locking seats on said columns, a rotary latch casting adapted to support said air piston at an approximate molding position, said latch casting being carried by said air piston and being adapted for manual rotation about said air piston into and out of engagement with said locking seats, a short-stroke high pressure hydraulic cylinder mounted on said air piston, said hydraulic cylinder being adapted to move said female mold member from said approximate molding position to final molding relationship with said male mold member, a second short-stroke high pressure hydraulic cylinder mounted to act in a direction to maintain the divided female mold members in molding relationship, and a pneumatically operated kicker cylinder arranged for engagement with female mold assembly while it is out of molding position to break apart the divided halves of the hinged female mold for removal of the finished article.

2. Apparatus for molding deeply contoured hollow concavo-convex articles such as helmet liners, binocular carrying cases and the like, said apparatus comprising an upright frame, a male mold member mounted in fixed relationship to said frame, said member being cored for heating by the introduction of heating fluid thereto, a flexible diaphragm of extensible material associated with said male mold member and being secured around the base thereof so as to define a fluid-tight chamber therewith, communicating means for connecting with said fluid-tight chamber introducing fluid under pressure thereto, means for exhausting fluid from said chamber, means for restricting the return flow of exhausted fluid to said chamber, a deeply contoured female mold member mounted for vertical movement toward and away from said male mold member and being adapted to mate with the male mold member, said female mold member being divided substantially in half and the divided parts thereof being hinged so as to swing open to permit introduction of the blank article before molding, said female mold members also being cored for heating by the introduction of a heating fluid thereto, a pneumatic cylinder and piston assembly for raising and lowering said female mold member, a short-stroke high pressure hydraulic cylinder mounted on said air piston and in turn having a piston floatingly supporting said female mold member, opposed locking seats on the upright frame, a locking member carried on said air piston adapted for manual rotation into and out of engagement with said locking seats, said locking member serving to support the hydraulic cylinder and female mold in molding relationship with the male mold member, and a second short-stroke high pressure hydraulic cylinder mounted to exert high molding pressure in a direction to maintain the divided portions of said female mold member in molding relationship.

3. Apparatus for molding deeply contoured concavo-convex articles, said apparatus comprising a frame, a female mold member, a male mold member comprising a convex metallic member and a flexible diaphragm of extensible material overlying said convex metallic member so as to form a fluid-tight chamber therewith, means for heating both mold members, means for supplying fluid under pressure to said fluid-tight chamber under static pressure so as to favor superheating of said fluid in said chamber, means for exhausting fluid from said chamber, means for restricting return flow of fluid to said chamber, one of said mold members being mounted for vertical movement toward and away from the other of said mold members, pneumatically operated means for raising and lowering said movable mold member into and out of approximate molding relationship with the other of said mold members, manually operated locking means for positioning said movable mold member in said approximate molding relationship, short-stroke hydraulic means carried by said pneumatically operated means, said hydraulic means in turn engaging and supporting said movable mold member and being arranged so as to move said mold member into final molding relationship with the other of said mold members.

4. Apparatus for molding concavo-convex articles, said apparatus comprising a frame, a concave mold member split and hinged for opening thereof, a convex mold member, both of said mold members being cored for heating and having communicating means for supplying heating fluid thereto, said convex mold member comprising an elongated element of metallic material and a flexible diaphragm of extensible material overlying said element and forming a fluid-tight chamber therewith, one of said mold members being mounted for movement toward and away from the other of said mold members, pneumatically operated means for relatively moving said movable mold members into and out of approximate molding relation, locking means for positioning said pneumatic means in approximate molding relation with the other of said mold members, short-stroke hydraulically operated means for movement of said movable mold member into final molding relationship, auxiliary short-stroke hydraulically operated means acting in conjunction with said first hydraulic means for maintaining said split portions of said concave member in final molding relationship, means for heating both mold members, means for introducing fluid under pressure to said chamber, means for exhausting fluid from said chamber, means for restricting the return influx of fluid thereto, and fast-action kicker means for opening the split portions of said concave mold member to facilitate removal of the finished article therefrom.

5. Apparatus for molding concavo-convex articles, said apparatus comprising a frame, a concave mold member split and hinged for ready introduction of molding material and removal of the finished article, a convex mold member having a flexible diaphragm of extensible material forming a fluid-tight chamber therewith, pneumatically operated means for moving one of said mold members into and out of approximate molding relation with the other of said mold members, locking means independent of said pneumatic means for positioning said pneumatic means in said approximate molding relationship, hydraulically operated means in conjunction with said pneumatic means for moving said movable mold member into final molding relationship, hydraulically operated means independent of said pneumatic means for maintaining the split portions of said concave mold member in final molding relationship, means for supplying heat to both mold members, means for supplying fluid under pressure to said chamber, and means for permitting efflux of said fluid from said fluid-tight chamber but restricting influx of fluid thereto.

6. Apparatus for molding concavo-convex articles, said apparatus comprising a heated concave mold member, a convex mold member, said convex mold member comprising a heated metallic member and an overlying flexible diaphragm of extensible material defining a fluid-tight chamber therewith, pneumatic means for moving one of said mold members toward and away from the other of said mold members, locking means for positioning said movable mold member in approximate molding relation to the other said mold member, hydraulic means mounted for travel with said movable mold member and acting by direct force in line with the movement of said movable mold member so as to move it into final molding relationship with the other of said members, means for introducing fluid under conditions of static pressure to said pressure-tight chamber, means for exhausting fluid from said chamber and means for preventing influx of fluid to said exhausted chamber.

7. Molding apparatus comprising a concave heated mold member, a mating convex mold member, said convex mold member being a metallic member having an overlying diaphragm of extensible material defining a fluid-tight chamber with said metallic member, one of said mold members being movable toward and away from the other of said mold members, pneumatic means for moving said movable mold member, locking means for positioning said movable mold member in approximate molding relationship, hydraulic means mounted for travel with said movable mold member and acting by direct force in line with the movement of said movable mold member so as to move it into final molding relationship with the other of said mold members, means for introducing an evaporable liquid to said fluid-tight chamber under conditions of static pressure, means for exhausting said liquid from said chamber and for restricting the return of fluid to said chamber for creating a vacuum under said flexible diaphragm and thereby pulling said diaphragm away from the molded article.

8. In a molding apparatus having within a press frame a mold adapted to be taken apart for introduction of molding material and for removal of the molded article, a compound pressure-exerting means comprising a pneumatically operated, fast-action elevating means for elevating one of said mold members into approximate molding relation to the other of said mold members, means for positioning said elevating means in approximate molding position, short-stroke, high-pressure hydraulic cylinders acting in conjunction with said positioned elevating means to close said mold in final molding relationship and a high-pressure hydraulic pressure-exerting bag within said mold acting in direct expansive opposition to said cylinders said bag and said hydraulic pressure-exerting means being supplied with high pressure fluid of the same pressure and from the same source, said hydraulic cylinders exerting a force to close said mold always at least equal to the force exerted by said bag tending to open said mold.

9. In a molding apparatus the combination with a mold adapted to be taken apart for introduction of the molding material and for removal of the molded article of a compound pressure-exerting means comprising fast-action pneumatically operated means for opening and closing said mold, short-travel, high-pressure hydraulic pressure-exerting means for exerting high molding pressure and a high-pressure hydraulic pressure-exerting bag within said mold acting in direct expansive opposition to said hydraulic pressure-exerting means, said bag and said hydraulic pressure-exerting means being supplied with high pressure fluid of the same pressure and from the same source, said hydraulic pressure-exerting means exerting a force to close said mold always equal to or greater than the force exerted by said bag tending to open said mold.

10. In a molding apparatus the combination with a mold adapted to be taken apart for introduction of the molding material and for removal of the molded article of a compound pressure-exerting means comprising fast-action pneumatically operated means for opening and closing said mold, short-travel, high pressure hydraulic pressure-exerting means mounted for travel with a portion of said mold for exerting high molding pressure against said mold, a high-pressure hydraulic pressure-exerting bag within said mold acting in direct opposition to said hydraulic pressure-exerting means, said hydraulic pressure-exerting means exerting a force to close said mold always equal to or greater than the force exerted by said bag tending to open said mold, means for supplying from the same source an evaporable fluid under the same pressure to said hydraulic pressure-exerting means and said bag, and means for maintaining a slower rate of flow to said bag than to said cylinders.

11. In a molding apparatus the combination with a mold adapted to be taken apart for introduction of the molding material and for removal of the molded article of a compound pressure-exerting means comprising fast-action pneumatically operated means for opening and closing said mold, short-travel, high pressure hydraulic pressure-exerting means mounted for travel with a portion of said mold for exerting high molding pressure against said mold, a high-pressure hydraulic pressure-exerting bag within said mold acting in direct opposition to said hydraulic pressure-exerting means, said hydraulic pressure-exerting means exerting a force to close said mold always equal to or greater than the force exerted by said bag tending to open said mold, means for supplying from the same source an evaporable fluid under the same pressure to said hydraulic pressure-exerting means and said bag, means for maintaining a slower rate of flow to said bag than to said cylinders, means for exhausting said fluid from said hydraulic means and said bag, and means for preventing the influx of fluid and air to said bag after exhaust.

12. In a molding apparatus, the combination of a female mold member, a male mold member comprising a metal inner member and a diaphragm of extensible material overlying the said inner member and forming a fluid-tight chamber therewith, one of said mold members being movable into and out of molding relationship with the other, means for introducing pressure fluid into said chamber, fluid pressure means including a piston urging the two mold members together directly against the expansive force exerted by said diaphragm, said chamber and said fluid-pressure means being supplied with fluid under pressure from a common source and the effective area of said piston exceeding the effective projected area of said diaphragm so that the force tending to close the mold by reason of pressure in said fluid pressure means always exceeds the force tending to open the mold by reason of pressure in said chamber.

13. Molding apparatus comprising within a press frame, a mold comprising a plurality of members one of which is a deep concave member split at generally right angles to the main parting line of the mold for insertion of molding material and for removal of the finished article, the other of said mold members being a deep convex stationary member adapted to cooperatively receive said movable, opening mold member, a compound pressure-exerting means, said compound pressure-exerting means comprising a fast action elevating device for moving said movable mold member into approximate molding relation with respect to the stationary member, a plurality of coacting hydraulic pressure-exerting means adapted by operating generally at right angles to maintain the opening member of said mold in molding relation and a hydraulic pressure-exerting bag within said mold acting in direct expansive opposition to said coacting hydraulic pressure-exerting means, and means for breaking open said opening member of said mold to facilitate removal of the finished article.

14. Molding apparatus comprising within a press frame, a mold comprising a plurality of members one of which is arranged to be movable and to be opened at generally right angles to the main parting line of the mold for insertion of molding material and for removal of a finished article, the other of said mold members being stationary to cooperatively receive said movable opening mold member, a compound pressure-exerting means, said compound pressure-exerting means comprising a fast action pneumatically operated elevating device for elevating said opening mold member into approximate molding position with relation to the other said member, a plurality of hydraulic pressure-exerting means adapted to coact substantially at right angles to close the opening member of said mold and to maintain the members of said mold in molding relation, and a hydraulic pressure-exerting bag within said mold.

15. Molding apparatus comprising a concave mold member, a mating convex mold member, rapid-acting means for moving one of said mold members toward and from the other, means for positively locking the mold members in approximate molding relationship, means coacting with said locking means for moving said mold members into final molding relationship under high pressure, said convex mold member comprising a convex dome of rigid material and a concavo-convex diaphragm of extensible material overlying the rigid dome and forming a fluid-tight chamber therewith, means for supplying an evaporable liquid under pressure to said chamber, means for positively confining said liquid in said chamber, means for heating said liquid to a temperature above its normal boiling point, and means for collapsing said diaphragm against said dome by reducing the pressure within said chamber through the evaporation of said liquid and the cooling of the evaporated liquid below its boiling point, the last said means comprising exhaust means for rapidly exhausting the chamber to substantially atmospheric pressure including means responsive to the flow of fluid through said exhaust means to prevent the intake of fluid through the exhaust means.

FRANK J. MacDONALD.

REFERENCES CITED

The following references are of record in the file of this patent:

UNITED STATES PATENTS

| Number | Name | Date |
|---|---|---|
| 1,370,185 | Capps | Mar. 1, 1921 |
| 1,906,328 | Maynard | May 2, 1933 |
| 1,943,996 | Williams et al. | Jan. 16, 1934 |
| 2,020,669 | Williams | Nov. 12, 1935 |
| 2,272,887 | Allen | Feb. 10, 1942 |
| 2,313,623 | Bungay | Mar. 9, 1943 |
| 2,363,107 | Young | Nov. 21, 1944 |
| 2,363,431 | Moorhouse | Nov. 21, 1944 |